US005639240A

United States Patent [19]
Werzberger

[11] Patent Number: 5,639,240
[45] Date of Patent: Jun. 17, 1997

[54] INTERACTIVE BOOK ASSEMBLY

[76] Inventor: Bernice Floraine Werzberger, 1252 Mayfair Dr., NE., Atlanta, Ga. 30324

[21] Appl. No.: 518,480

[22] Filed: Aug. 23, 1995

Related U.S. Application Data

[63] Continuation-in-part of Ser. No. 294,442, Aug. 23, 1994, Pat. No. 5,558,520.

[51] Int. Cl.$^6$ .................................................. G09B 11/06
[52] U.S. Cl. ............................................................ 434/88
[58] Field of Search ............................ 434/88, 113, 156, 434/178, 308, 317, 327, 349

[56] References Cited

U.S. PATENT DOCUMENTS

| | | | |
|---|---|---|---|
| 1,289,342 | 12/1918 | Wittie | 434/88 |
| 1,456,834 | 3/1923 | Sheffield . | |
| 1,530,418 | 3/1925 | Saylor . | |
| 1,583,061 | 5/1926 | Loughridge | 434/88 |
| 2,075,529 | 3/1937 | Leubrie | 434/88 |
| 2,103,943 | 12/1937 | Gorton | 434/88 |
| 2,789,373 | 4/1957 | Frankl | 434/88 |
| 2,932,095 | 4/1960 | Keeler | 434/88 |
| 3,200,514 | 8/1965 | Kopel . | |
| 3,242,596 | 3/1966 | Smith . | |
| 3,364,598 | 1/1968 | Cook | 434/88 |
| 3,426,447 | 2/1969 | Montgomery . | |
| 3,484,952 | 12/1969 | Coldren | 434/88 |
| 3,492,743 | 2/1970 | Schmidt | 434/88 |
| 3,889,397 | 6/1975 | Flood | 434/88 |
| 4,575,126 | 3/1986 | Grubbs . | |
| 4,712,673 | 12/1987 | Moore . | |
| 4,973,184 | 11/1990 | La Salle . | |
| 4,978,143 | 12/1990 | Ericson . | |
| 5,029,902 | 7/1991 | Komori . | |
| 5,056,824 | 10/1991 | Olson . | |
| 5,080,590 | 1/1992 | Frisque | 434/88 |
| 5,161,978 | 11/1992 | Kahn . | |
| 5,165,721 | 11/1992 | Schwartz . | |

FOREIGN PATENT DOCUMENTS

| | | | |
|---|---|---|---|
| 700347 | 12/1953 | United Kingdom | 434/88 |
| 2128937 | 5/1984 | United Kingdom | 434/88 |

*Primary Examiner*—Paul J. Hirsch
*Attorney, Agent, or Firm*—Jones & Askew

[57] ABSTRACT

An interactive coordinated book assembly useful for teaching in a parent/child, teacher/student or self-study environment, comprising: a plurality of left and right main pages, the pages containing textual material and a key word on each page, (The key word may be different on each page); a plurality of left and right activity pages, each of the activity pages containing an activity area and a direction text area; the main pages and the activity pages being alternately interleaved and bound along one edge to form a book; the direction text area on the activity page area containing at least one activity to be read by a parent to a child, the direction area text on the right activity page being reverse coordinated with the key word appearing on the left main page and the direction text area on the activity page area containing text to be read by a parent to a child, the activity being coordinated with the key word appearing on the right main page, the left activity page containing a repetition of the key word present in the adjacent right main page and the right activity page containing a repetition of the key word present in the adjacent left main page. The key word relates to the story text and the activities on a given page relate to the key word. The activities have codes associated therewith indicating the type of activity and for what age level of child the activity may be appropriate. The assembly may also contain higher educational level courses of study for use by a teacher and student or for self-study.

5 Claims, 9 Drawing Sheets

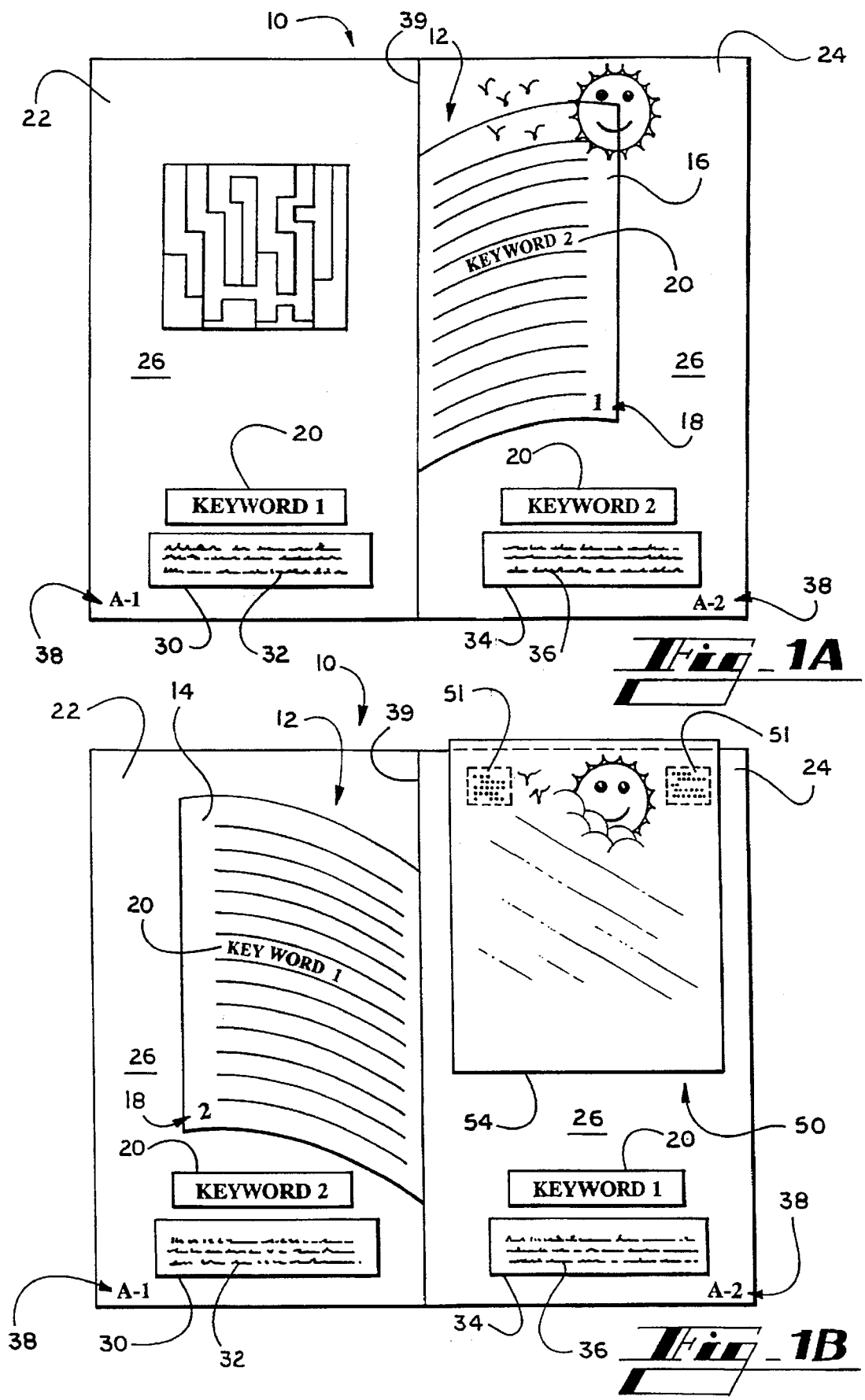

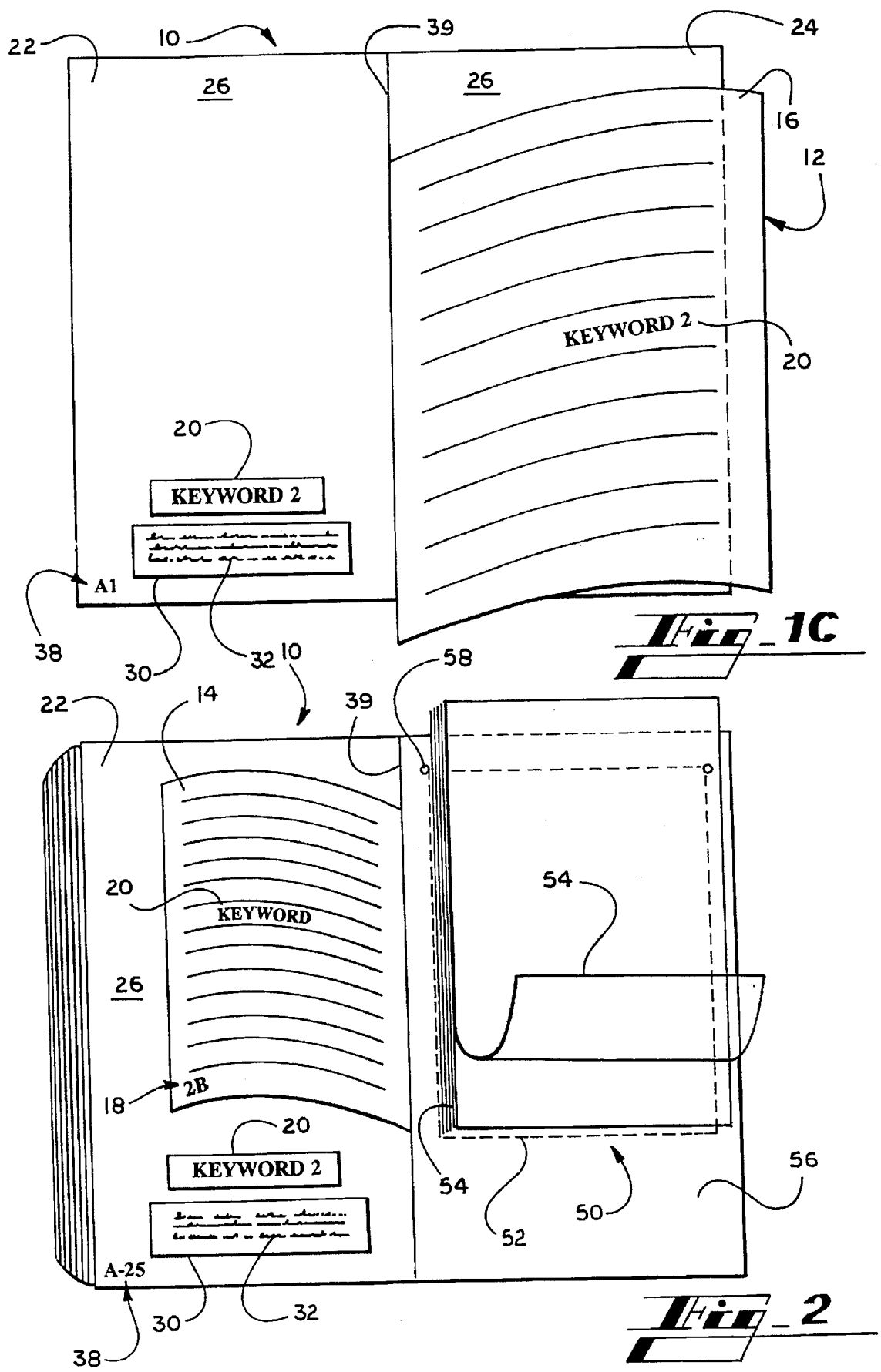

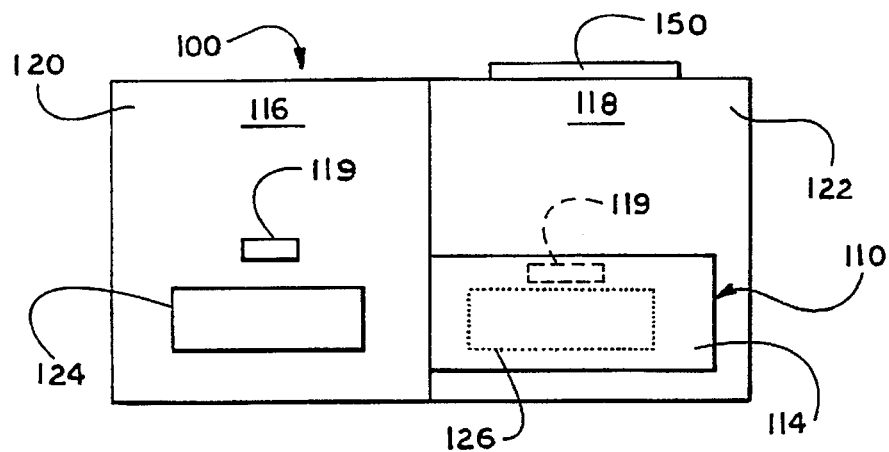
Fig_3A
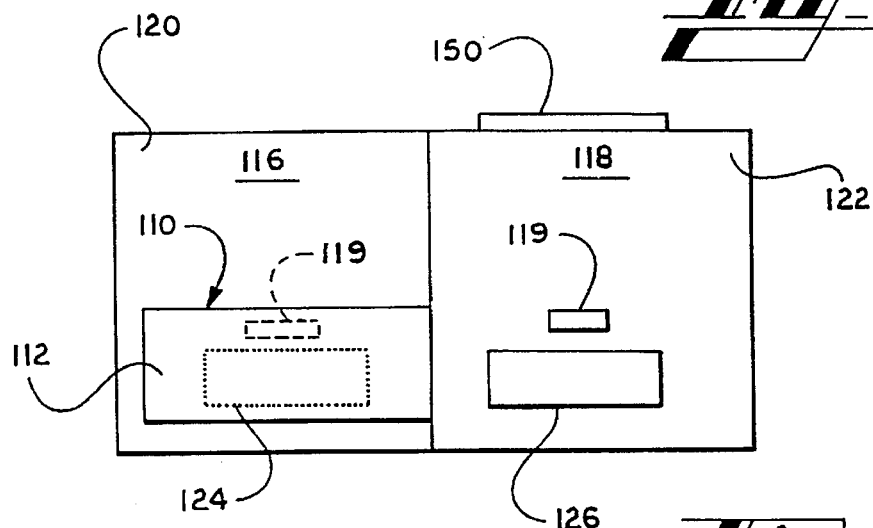
Fig_3B
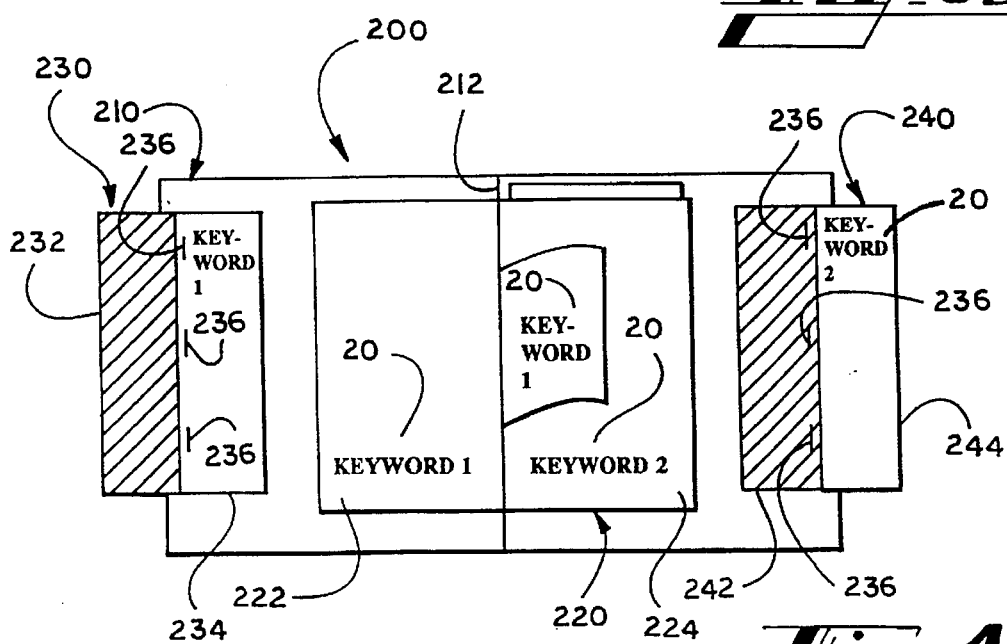
Fig_4A

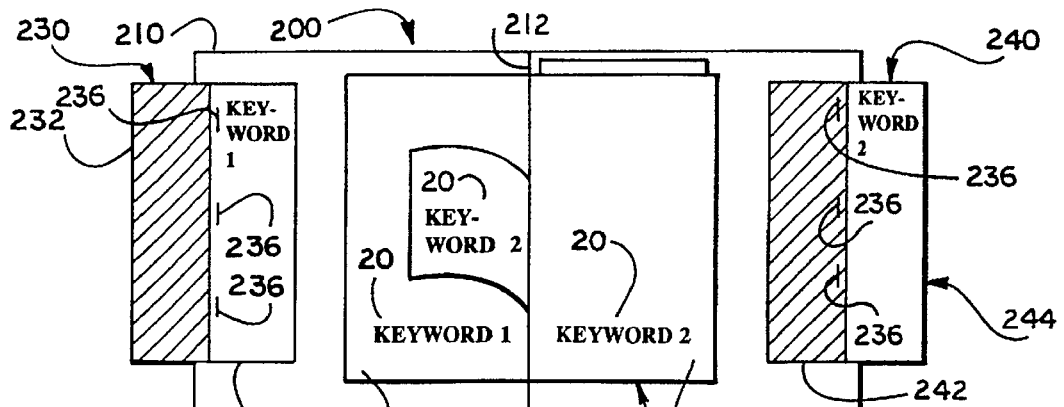
FIG_4B
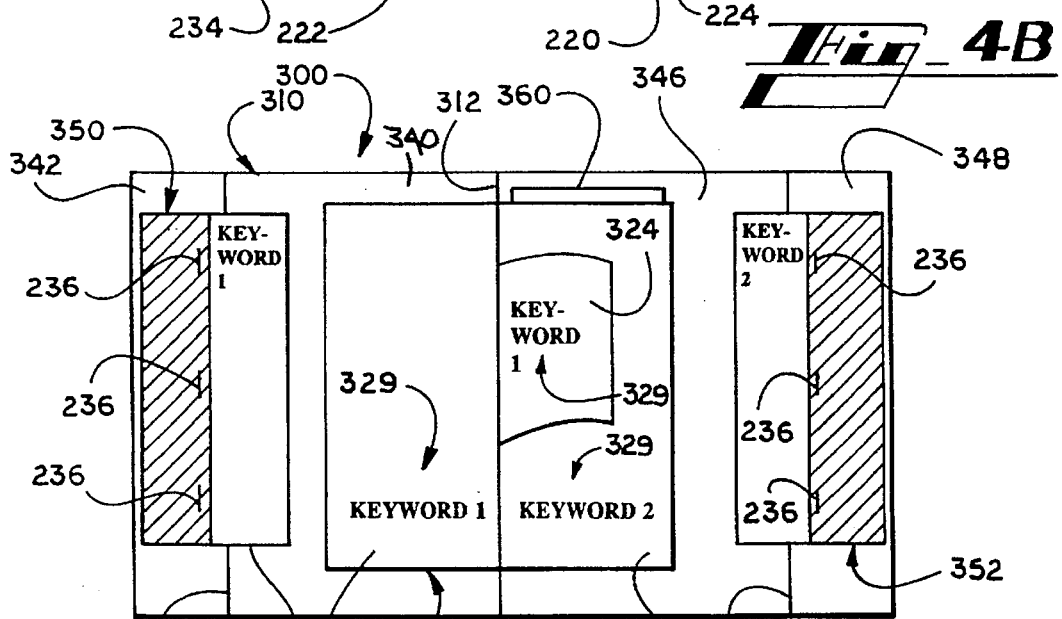
FIG_5A
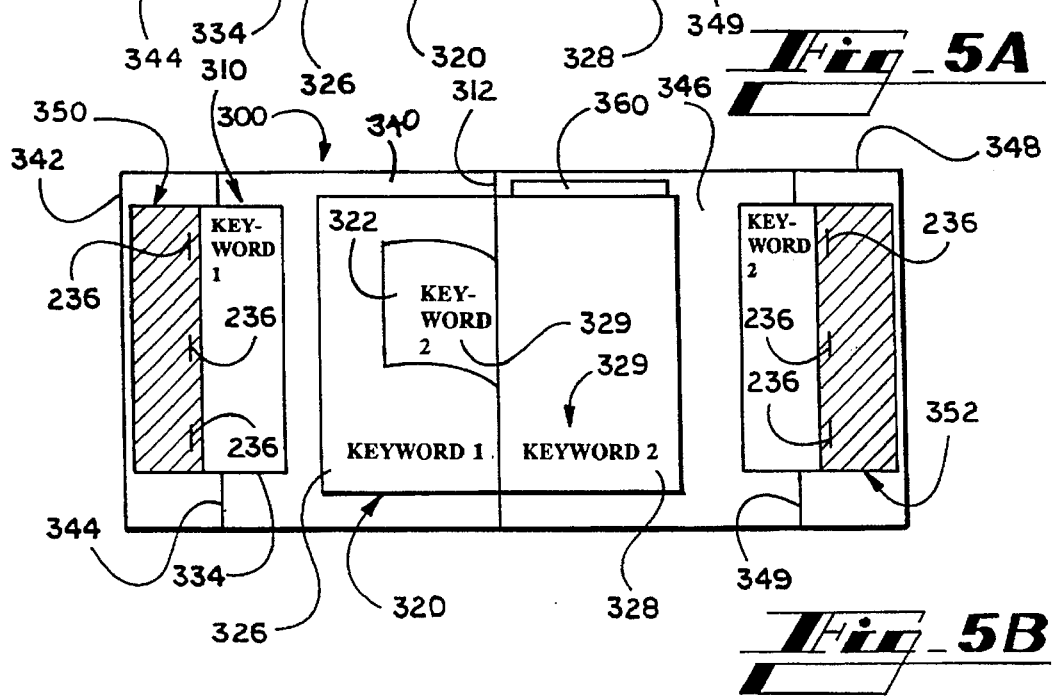
FIG_5B

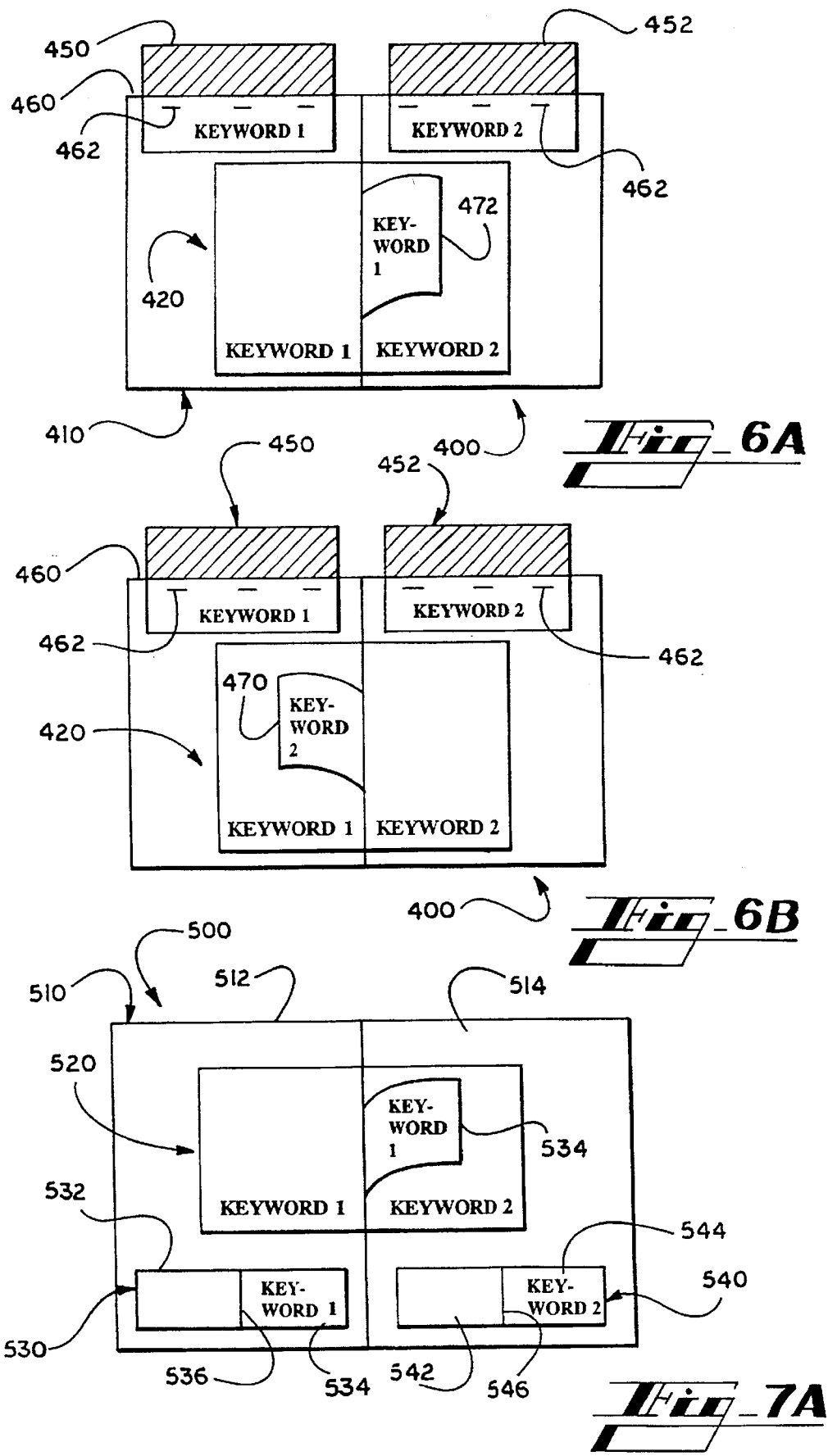

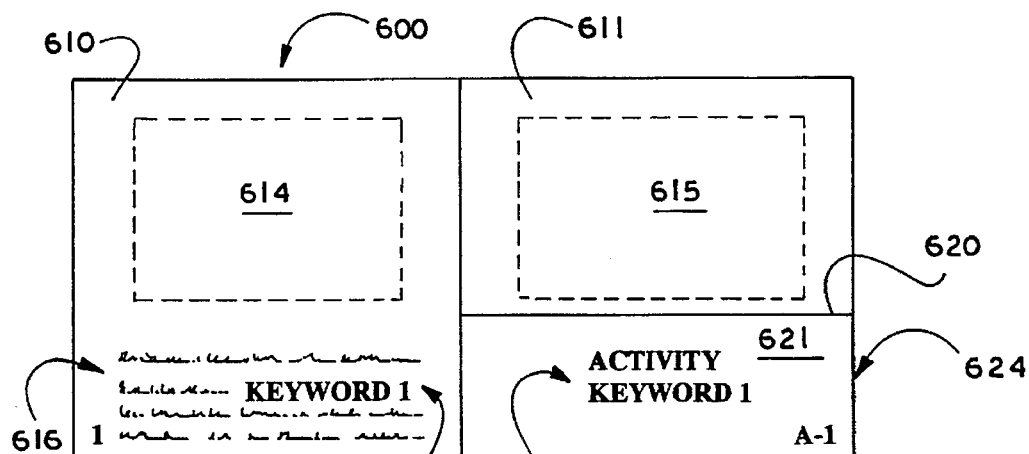
Fig_8A
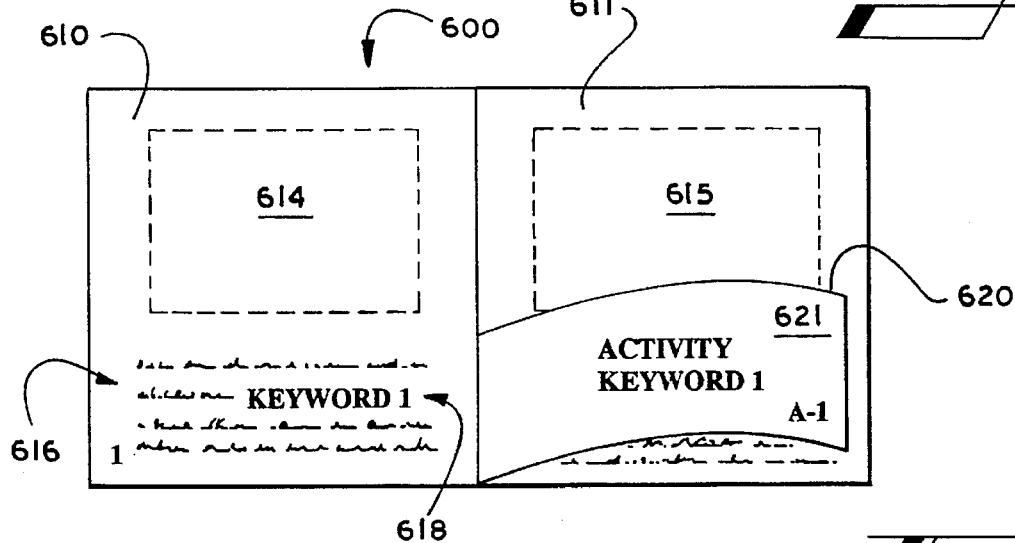
Fig_8B
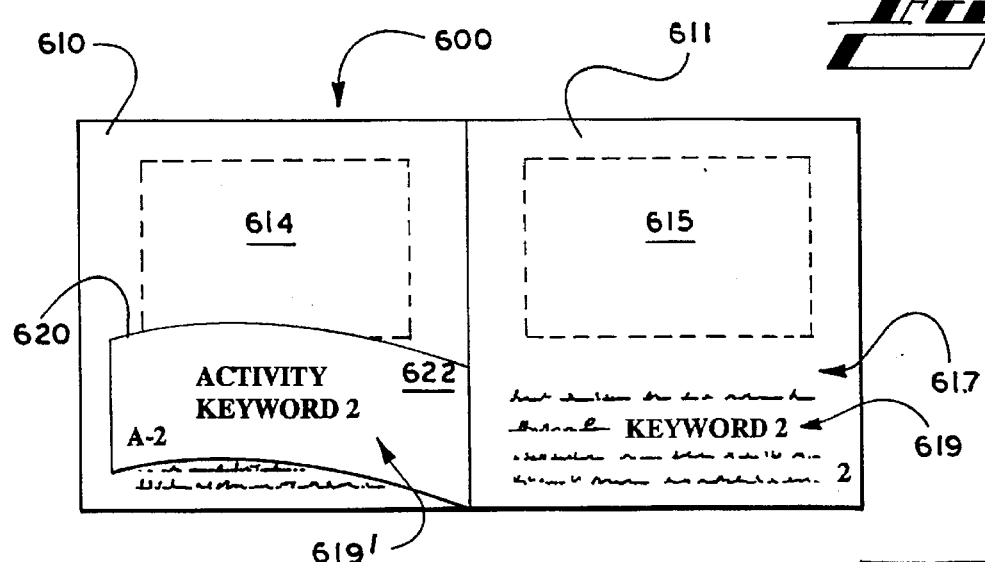
Fig_8C

INTERACTIVE BOOK ASSEMBLY

CROSS REFERENCE TO RELATED APPLICATION

This application is a continuation in part of application Ser. No. 08/294,442 filed Aug. 23, 1994 now U.S. Pat. No. 5,558,520.

FIELD OF THE INVENTION

The present invention relates to instructional or educational book assemblies, and more particularly to an interactive coordinated set of textual and activity materials designed to be used by a parent and child with activities for developing a child's skills being indexed to key words in a story text. The story is integrated with a specially designed parenting activity guide to form one combined book. Each page of the story is adjacent to an illustrated page of the activity guide. The design of the guide allows parents or teachers to introduce learning activities by simply reading to the child as directed.

BACKGROUND OF THE INVENTION

There are types of educational or instructional materials that use a main book that the student uses and a separate guide book or "teacher's manual" that the teacher uses which explains or interrelates with the subject matter of the main book. Frequently, these guide books can be used in several ways, including: instructing the teacher how to teach the subject matter; providing instructions for implementing a given lesson; giving additional ideas on activities for the lesson, and the like. They are typically designed for a classroom situation where one teacher will be interacting with many students. One of the problems with these types of guide books is that they are not adequately interactive with the student's book. It is difficult for a teacher and student to sit together on a one-to-one basis and interact because the teacher must use a different book than the student, causing coordination problems and the need for two books. Additionally, these types of teacher/student books are not effectively coordinated to make use of important words or phrases in the student's text and to ask questions, discuss or otherwise teach on such an individualistic basis. The same is true for parents since no interactive guide exists.

In the context of the present specification the invention discussed herein is primarily designed for use by a parent and child so that the child can use it alone or with a parent or other adult. The terms parent and child will be used to describe a relationship between a developmentally older person and a younger person, and is intended to include terms such as teacher and student.

It would be desirable to have a unified book that would facilitate one-on-one skill development such that the teacher would be able to interact with the student using the same materials, such as where language-based skills are being taught. Such a unified book would be desirable for parents while reading to and teaching their children. It would also be desirable to have a unified interactive text and workbook combined in one book or kit with directions and activities adjacent to the text and reverse-indexed to the text.

It is further desirable to provide a unified book assembly usable by parent and child together and also usable by a child individually. It is further desirable to have such a book assembly useful by children with learning impairments such as dyslexia.

BACKGROUND OF THE PRIOR ART

Several patents have issued relating to indexed text and answer or text and auxiliary book assemblies, including U.S. Pat. Nos. 1,456,834 (Sheffield); 3,200,514 (Kopel); 3,242,596 (Smith); 3,426,447 (Montgomery); 5,056,824 (Olson); and 5,161,978 (Kahn). Kopel discloses an instructional device for self-administration of tests, where questions are visible on both sides of a main booklet and answers are contained in a separate area that is hidden by a sliding tab that reveals an answer when the area is exposed. Smith discloses a combination of learning materials and self-scoring tests in which a removable auxiliary book containing a dictionary, index, and/or quiz is located at the back of the main book. Montgomery discloses an instructional book in which answers are interleaved upside down and across from questions.

Many of these inventions are directed to question and answer formatted material and provide a method for a student to have answers available but not immediately visible. These inventions attempt to place question text and answer text in some physical proximity which is unreadable until a positive action is taken to expose or render the answers readable. These patents try to interrelate questions and answers or main text and auxiliary text for use generally by one person. None of these books or assemblies are designed for use by both a parent and child or a teacher and student. It would be desirable for a book to guide parents to be indexed such that the text is indexed and adjacent to a direction or activity area for direct use by the parent or teacher.

It would be desirable to have an interactive book that is organized to present a story text that can be read or followed by a child and interrelated activities that are indexed to words in the story or the story content.

It would also be desirable for an interactive parenting or teaching book assembly to have a story book portion that is coordinated yet separable from an activity book portion so that a parent and child can use both book portions together yet permit the child to remove the story book portion so that he or she can read or reread the story without the activity book portion.

SUMMARY OF THE INVENTION

The present invention provides in its broadest embodiment an interactive parenting or teaching book assembly having an introductory instruction guide, a story book portion and an interleaved coordinated reverse-indexed activity portion that is visually cued to the story text or graphics. The activity portion contains directions for a parent to read to a child and also activities for the children, such as mazes, hidden pictures, or the like. These directions have accompanying symbols that can indicate the type and level of activity. A symbol guide at the beginning or the end of the materials translates the symbols and is a second reverse index.

More particularly, a preferred embodiment of the present invention provides main book pages on which a story or other text or graphical material is printed and activity pages which can contain discrete or intermixed direction areas and picture areas. The smaller story or text pages of the main book are alternately interleaved and consistently alternate with the larger activity pages. The text of the story contains at least one word, phrase or natural focal point in the story on each page that is considered a key word and is visually or otherwise distinguishable from the other text on the page, such as by being in bold, colored, highlighted, textured, or the like. The term "key word" is intended to describe either a word, phrase or sentence in the text. The activity area contains a direction area that has text cued to the key word.

The direction area text is used as a guide to explore the key word in context with the story with the child in such areas as definition, meaning, reasoning, shape or color recognition, vocabulary and many other areas. A portion of the activity area can contain a picture area which can be coordinated to the story text and made part of the activity in the direction area; for example, the activity area can contain pictures, mazes, borders or the like. The border area around the edge of the activity page can contain images that coordinate with activities, such as a border containing a number of stars and an activity directing the parent to ask the child to count how many stars there are in the border. It is preferable that the main text pages are smaller than the activity pages so that activity pictures can be seen around the main text pages when overlaid. The activity pages are reverse indexed so that the key word on the left page of the main text page is indexed to the direction text area on the right activity page and the key word on the right page of the main text page is indexed to the direction text area on the left activity page. Coordinated page numbers on the activity pages and the main text pages assist in recognition. The key word is repeated proximate to the direction text area for identification by the parent or teacher. The activities can include interrogatories, statements and/or instructions, i.e., to direct the parent or teacher to ask a question of the child, state something to the child or to instruct the parent or teacher in a particular approach to the activity. The material is designed to be read directly to the child without the need for rewording or interpretation by the reader. There may be one or more activities for one or more keyword and one or more types of activities, age groups, or the like.

The type of activity in the direction area is coded by symbols such as letters, numbers or shapes next to the activity. These indexed symbols are in a translation guide which is presented on a separate page in the back, front or elsewhere in the book. These coded symbols are useful for a parent to understand the nature and purpose of the activity. The age or developmental stage recommended for doing certain activities is distinctively coded by a separate symbol or can be combined with the activity type code, such as by color or shape of a border surrounding the activity type code. The age code is also translated in the translation guide since age codes are also placed next to the activities. In some embodiments of the present invention the age code has different font styles. Thus particular activities targeted at particular ages are all printed or written in a first particular font and activities aimed at a second age group are produced in a second particular font. The two codes are useful in providing additional adjacent instructions for use by the parent. After the parent is familiar with the codes, he or she can routinely utilize activities that are appropriate for the particular child or challenge the child with more difficult activities without frustrating the child. In a preferred first embodiment the main and activity pages are bound by a single seam to a hard or soft cover, as is known in the art. A pad of tracing paper bound to a stiff backing material can be removably mounted to the back and/or front inside covers of the book, such as by VELCRO or by a pocket in the cover into which the backing material can be slid and maintained. The pad can be sized to extend slightly above the top of the activity pages so that a sheet of tracing paper can be raised and placed over the main and/or activity page so that the child can trace over pictures or words while maintaining the rest of the pad attached to the backing in place at the back or front of the book. The pad can be removed for storage or replacement. In a second alternative embodiment of the present invention a separate main book containing story text is removably attached to a stiff backing cover by either VELCRO, an elastic band or other means. The backing cover can be made of left and right halves flexibly joined together at a seam. To both left and right sides of the cover are attached a left page activity book and a right page activity book, respectively, so that the left activity book contains direction areas indexed to key words on the left pages of the main book and the right activity book contains direction areas indexed to key words on the right pages of the main book. The main book, which can contain a tracing pad removably mounted to its back and/or front covers as in the preferred embodiment, can be removed from the stiff backing cover containing activity books and read separately, if desired.

In a further alternative third embodiment the left and right activity books can be mounted to the cover above or below the respective left and right main book pages.

The present invention can be used as a parenting tool in relationship building with a child by coordinated interaction and learning. The child can read or follow along with the story itself with or without a parent being present. As often happens, children enjoy rereading the same story many times, either alone, with a parent or sibling or having it read to them.

The present invention can also be used to facilitate individual or group learning or in higher levels of learning whereby a student working alone and learning a new language, music, science, math, or the like can learn by interacting with the main text and with an interlaced adjacent activity area that explains or guides the student to greater understanding. An example of this is in learning geometry where the main text could contain a diagram of a geometric shape and a theorem or axiom. The activity area may query the student about the next step in the proof of the theorem or axiom or instruct the student to draw certain lines on an incomplete figure, or teach other developmental activities. Accordingly, it is a principal object of the present invention to provide an educational tool that facilitates interaction between a parent and a child by coordinating written materials with indexed key words that can be the subject of learning or developmental activities facilitated by the parent. It is a further object of the present invention to provide an interactive book assembly having separate areas for text, (such as a story), and for activities, in which a parent or teacher can guide a child or student through activities without restructuring or rewording the directions to do the activities with the child or student as directed.

It is another object of the present invention to provide an interactive book in which key words of a story text are reverse indexed to separate coordinated activity pages containing directions that a parent can use to teach a child.

It is a further object of the present invention to provide an interactive book having a removable tracing pad the individual pages of which can be overlaid on pages containing text or pictures and is attached to the back and/or front of the book.

It is yet a further object of the present invention to provide an educational book assembly having an introduction providing instructions on the use of the book, main text pages which can contain a story text and a key word preferably on each page, activity pages coordinated with the story text and having an activity area and a direction area, the direction area having the key work repeated and direction text designed to explore the keyword and accompanying text with the child, and a nonadjacent translation guide for translating symbols present in the adjacent direction area.

The book assembly can have a removable tracing pad associated therewith.

Embodiments of the present invention may also be constructed with removable or permanently attached tracing pads that are particularly suitable for children with learning impairments such as dyslexia. In particular, a sheet of pastel colored transparent material, such as acetate, is including as a overlay for the picture being traced. It is known to those who have studied children with visually processing related learning disabilities such as dyslexia that a pastel colored background can aid such children in the processing of visual information on a page.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which:

FIGS. 1A and B show a plan view of a preferred embodiment of the present invention.

FIG. 1C shows a plan view of the preferred embodiment of the present invention wherein the interleaved text and activity pages are of a similar size but offset from each other on two sides.

FIG. 2 shows a plan view of the preferred embodiment of the present invention showing the main text left page and the tracing paper pad.

FIGS. 3A and B show a plan view of an alternative first embodiment of the present invention.

FIGS. 4A and B show a plan view of an alternative second embodiment of the present invention.

FIGS. 5A and B show a plan view of an alternative third embodiment of the present invention.

FIGS. 6A and B show a plan view of an alternative fourth embodiment of the present invention.

FIGS. 8A through 8C show plan views of an alternate sixth embodiment of the present invention.

DESCRIPTION OF THE PREFERRED EMBODIMENT

Figure 7B:
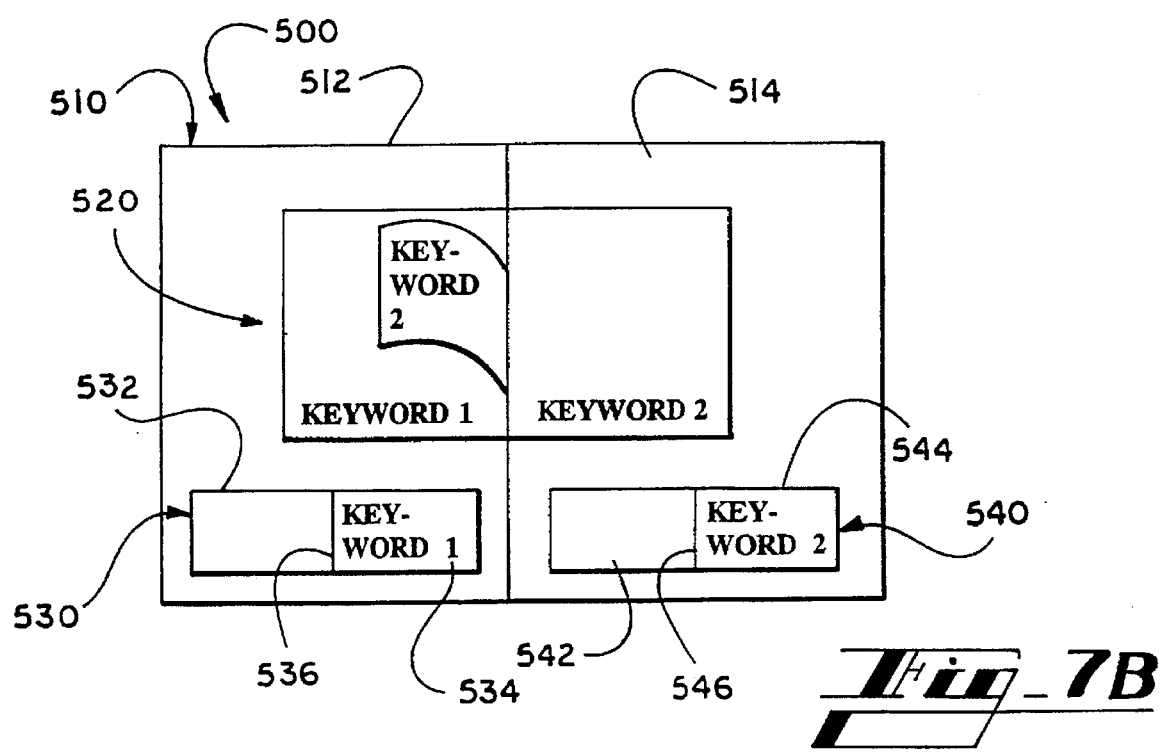
FIGS. 7A and B show a plan view of an alternative fifth embodiment of the present invention.

FIGS. 1A and 1B show a preferred embodiment of a book assembly 10 having a main text 12 consisting of main text left pages 14 and main text right pages 16. The main text 12 has matter printed thereon and is preferably a story or other text. For the purposes of discussion of the preferred embodiment, the main text 12 will be considered to have a story, such as a fable, fairy tale or the like, although many other types of printed text matter can be used, such as language lessons, science, math, music, art, drawing, and the like. The main text pages 14 and 16 are preferably indexed by page numbers 18. Each main text page 14 and 16 has at least one key word 20 (for the present discussion the term "key word" shall be considered to incorporate words, phrases, sentences or natural focal points in the story) anywhere appropriate in the text that is visually distinguishable over the other words. Such identification can be accomplished by displaying the key word 20 in bold, color, highlight, different style font, or means of visual distinction known in the art. Alternatively, it is possible for the key word 20 to be tactilely different, such as by printing the key word 20 with a textured material. It is contemplated that the present invention can be used with Braille, so that blind children can read a story and learn words by the feel of the key word texture. The key word 20 is typically a word or phrase that is a part of the story and is so that a child can learn recognition and the meaning of the word, the context in which it is used, or other developmental skill building exercises, particularly in language based activities. The function and use of the key word 20 will be discussed in greater detail hereinbelow. The key word 20 is the core around which the learning activities are designed and organized.

The book assembly 10 also has left activity pages 22 and right activity pages 24. Each activity page 22 and 24 has an activity area 26, which can include pictures, mazes (as shown in FIG. 1A), or other graphical or textual matter. The activity pages can also include a border area around the periphery of the page (not shown in the drawings). In embodiments where the main text pages 14 or 16 are close in size to the activity pages 22 or 24, a border is automatically formed when the main text page is overlaid on the activity page. This border area can contain visual matter that can be part of the activity area.

The matter in the activity area 26 is preferably coordinated to the main text 12 on the opposite main text page 14 or 16 as described in detail hereinbelow. The left activity page 22 also has a left page direction area 30 which contains direction text 32 coordinated to the key word 20 on the main text page 16. The right activity page 24 has a right page direction area 34 which contains direction text 36 coordinated to the key word 20 on page 14. The key word 20 is also repeated over the direction areas 30 and 36, as will be described in further detail hereinbelow. The activity pages are preferably indexed by page numbers 38. In a preferred embodiment the direction areas 30 and 34 are at the lower portion of the activity pages 22 and 24, respectively, but can alternatively be positioned elsewhere on the page, such as at the top of the page. The location is important so that the key word 20 and the direction text 32 and 36 are proximate to each other for visual recognition.

The main text pages 14 and 16 alternate with the activity pages 22 and 24 and all are bound at a seam 39 in any conventional binding manner, such as but not limited to glue, staples, stitching and the like. The main text pages 14 and 16 are preferably smaller in size than the activity pages 22 and 24. This permits pictures on the activity pages 22 and 24 to be seen while a child is reading the main text 12. The text pages can contain picture portions that complete a picture with the activity area used to teach picture completion skills. Alternatively, as shown in FIG. 1C the text pages 14 and 16 and the activity pages 22 and 24 can be of a similar size but offset with respect to the seam 39 so that the pages are visually distinguishable and a parent or child can turn them.

The book assembly 10 optionally has incorporated with it a tracing paper pad 50, as shown in FIG. 2, which comprises a stiff backing 52 and tracing paper pages 54, as are commercially available from art supply stores. The book assembly 10 has a preferably rigid cover 56 to which the pad 50 can be removably attached, such as by VELCRO®, glue or by a slot 58 in the cover 56 into which the backing 52 can be slid. The tracing paper 54 can be overlaid on the activity area pages 22 or 24 and a child can draw, trace or color over visual material on those pages. It is to be understood that the tracing pad 50 can also be on the inside front cover or on both inside covers. Alternatively, the tracing pad 50 can be on the outside cover, if desired. A key feature of the present invention is the coordination of text, pictures, activities and directions. The activity pages 22 and 24 are reverse indexed so that the key word 20 on the left page of the main text page 14 is indexed to the direction text 36 on the right activity page 24. The key word 20 on the right main text page 16 is indexed to the direction text 32 on the left activity page 22. It is to be understood that although the key word 20 is discussed as being a one word, the key word 20 is typically different on each page. Page numbers 38 on the activity pages 22 and 24 are coordinated to match the page numbers 18 on the main text pages 14 and 16 to assist in recognition; i.e., the left main text page 14 has the same page number 18 as the right activity page number 38 and the right main text page 16 has the same page number 18 as the left activity page number 38. For example, the main text pages 14 and 16 are numbered consecutively from the first page as: 1, 2, 3, 4, 5, . . . . The activity pages 22 and 24 are numbered A-1, A-2, A-3, A-4, A-5, . . . , so that the coordination between main text pages 14 and 16 and the activity pages 22 and 24 is 1:A-1, 2:A-2, 3:A-3, 4:A-4, 5:A-5 . . . . In this manner the parent has further information to know which activity page coordinates with which main text page.

The key word 20 on a given left main text page 14 is repeated proximate to the right direction area 34 and on a given right main text page 16 is repeated proximate to the left direction area 30 for identification by the parent or teacher. This reverse indexing or coordination of key words 20 in the main text 12 to the direction areas 30 and 34 is a critical novel element of the present invention and facilitates parental interaction with the child during the activities so that the parent can discuss the key word 20 on a given main text page 14 or 16 without having to turn pages in a separate parent's manual to find the correct place.

The direction areas 30 and 34 contain directions for instructing a parent or other reader to do activities with a child. The direction area 30 and 34 contain three basic types of directions: statements, interrogatories, and instructions. Statements tell the parent to state something to the child, interrogatories tell the parent to ask the child a question, and instructions instruct the parent in special points about a particular activity or other interaction with the child. The directions can be preceded with instructional text in italics (or other visually distinguishable print) such as "Say:", Then Say:", "Ask:", "Then Ask:". Over each direction area 30 and 34 is a key word 20 that is present in the opposing main text page 14 or 16, respectively. The type of activity directed is keyed from the story text 12 and there can be one or more types of activities per page. The type of activity can be designed for use with a particular developmental level of the child. For example, vocabulary may be appropriate for younger children while reasoning or rhyming activities may be appropriate for older children. Different level activities may be in the same activity area 26 so that the same story can generate learning activities for different age children. In this manner the child grows together with the book since the child can reread the story and the parent can teach higher level skills over time.

For example, the main text right page 16 may contain a story sentence: "A family of small sky-blue butterflies GATHERED on the grass outside the castle." The word "GATHERED" could be capitalized, highlighted or otherwise made more prominent from the remainder of the text for easy identification. The corresponding direction text 30 on the left activity page 22 could instruct the parent as follows: "Say: 'Three butterflies are gathered near the trunk of the tree. There's a design in the trunk of the tree. This kind of design is called a maze. It has very winding pathways.' (P) Then ask: 'Can you put your finger on the dot in the maze and trace the path from the dot to the top of the tree trunk with your finger? Remember, if your finger bumps into a line on the path, you'll have to stop and go a different way.'" The "(P)" means that this particular activity is designed to develop perception skills.

Questions relating to vocabulary may be appropriate for children of ages 3–5, questions relating to word association may be appropriate for children of ages 4–5, and questions relating to observation/art skills may be appropriate for children of ages 4–6. It is to be understood that the aforementioned age categories are presented for exemplary purposes only and may be variable, depending upon the type of question, story subject matter and the developmental age of the individual child.

Each activity area can have one or more activities. Activities can be directed to developing any of a number of learning areas, such as but not limited to, vocabulary, thinking, art, category recognition, numbers, sounds, mathematics, motor development, following directions, perception, science, visual memory, shapes, colors, self-awareness, writing, directional words, dramatic play, observation, memory, rhyming, letters, matching, word definition, meaning, recognition and extrapolation, letter, shape, color and pattern recognition, improvement of concentration, development of imagination, drawing, motor and perception skills (such as matching, tracing writing, mazes and hidden object recognition), picture completion, higher level thinking skills in general, including, recall, inference, evaluation, drawing conclusions, and the like.

The type of activity can be coded by symbols, such as, but not limited to letters, numbers or shapes which are indexed in a translation guide page, such as in the front or back of the book assembly 10 for use by a parent to understand the nature and purpose of the activity. The age or developmental stage recommended for doing certain activities is coded by a symbol or can be combined with the type of activity code, such as by color or shape of a border surrounding the activity type code. The age code is also translated in a translation guide in back of the book. The activity type and age level codes are useful in providing instructions for use by the parent to determine the appropriateness of the above-mentioned activities. For example, the following activities may be accorded the accompanying codes: perception (P), science (S), visual memory (VM), shapes (S), colors (C), self-awareness (SA), writing (W), and the like.

The age level of an activity may be coded in several ways. For example, different colored activity code letters may indicate the age level. An alternative would be to use different shaped boxes, within which are the activity codes, e.g., a circle may be for 3–4 year olds, a triangle may be for 4–5 year olds, and a square may be for all pre-school ages (3–6).

For example, a yellow square with the letters "VM" inside next to the direction text may indicate that the given activity is designed to develop visual memory (VM) and the yellow square indicates that this activity is appropriate for children from 4–6 years old. Any suitable choice of visual variables such as color, shape, text or the like can be used for coding and translation.

Using the present invention a given story can be reread many times over an extended period of years and, while the story remains the same, the child can learn more advanced skills by the parent utilizing different activities coded for the child's level of development. Similarly, the same book can be read by different children and each child can learn at his or her own age level because there are typically several different activities for different age levels on the same activity page 22 or 24.

It is to be understood that in the preferred, as well as the alternative, embodiments of the present invention as discussed herein, while the main text pages 14 and 16 contain the story and the activity pages 22 and 24 contain the activity area 26 and the direction areas 30 and 34, it is possible that the areas can be reversed and the main text can be printed on the activity pages and the activities and direction areas can be printed on the smaller pages 14 and 16.

It is to be further understood that the relative size of the main text pages 14 and 16 is smaller than the activity pages 22 and 24 of the preferred embodiment. However, it is also possible that the activity pages and main text pages 14 and 16 can be the same size but of a different shape. For example, FIG. 1C shows the main text pages 14 and 16 extending above the activity pages 22 and 24; the activity pages 22 and 24 can alternatively extend outward further to the left or right with respect to the main text pages 14 and 16. Alternatively, the pages can be tabbed for easy turning and reference.

A first alternative embodiment of the present invention is shown in FIGS. 3A and B, wherein a book assembly 100 has a main text book 110, left main text pages 112 and right main text pages 114, the pages being bound together as previously described. The pages 112 and 114 can contain the story text. Left activity pages 120 and right pages 122 are sized to be larger than the main text book 110, and preferably the width of the pages 120 and 122 is sufficient to cover substantially direction areas 124 or 126 when the activity page overlays that direction text area. The activity pages 120 and 122 contain the key word 119, as described in the preferred embodiment. In this embodiment, the activity pages 120 and 122 serve to conceal the direction text on the opposite page until the page is turned. The orientation of the activity pages 120 and 122 of this embodiment also permits a greater area of the activity areas 116 and 118 to be available for graphics or images, such as a picture occupying a two page spread. A tracing paper pad 150 can be attached as described in the preferred embodiment.

The following alternative embodiments in FIGS. 4–6 present a set of variations of the present invention in which the book assembly generally comprises a main book and activity book, the pages of which are interleaved and coordinated as described in the preferred embodiment; i.e., the main book has text pages with the story text printed thereon interleaved with activity pages that have pictures or other activity material. In these alternative embodiments, the key word appears in the text page and is repeated in the activity area and is coordinated as described above. A support backing has direction text books attached to both the left and right edges of the sides of the backing. The direction text in the direction books contains the repeated key word, corresponding activity direction text and skill symbols coordinated with the main book, as previously discussed. See, for example, the second alternative embodiment. The main book is removably attached to the backing. In this manner these embodiments form kits or assemblies in which the main book can be used with a parent present using the coordinated direction text pages or it can be used by the child alone with or without the direction books by removing the main book from the backing. Each of these embodiments can incorporate one or more tracing pads as described in the preferred embodiment removably attached to the backing of the front and/or back covers of the main book. In these embodiments the descriptive introduction to the parents, the direction symbols and translation guide and the text and child's activity areas are included as described in the preferred embodiment.

FIGS. 4A and B show a second alternative embodiment of the present invention, in which an assembly 200 has a stiff flat backing 210 which is flexibly bendable in the middle at a vertical seam 212, enabling the two halves thus defined to be closable in the same way as a book closes. A main book 220 has left pages 222 and right pages 224 and is removably bound to the backing 210. The main book 220 contains the interleaved story text pages and activity pages as described previously. A first direction book 230 has left pages 232 and right pages 234 bound together by staples 236, a seam or the like to the backing 210. A second direction book 240 has left pages 242 and right pages 244 bound together to the backing 210. The first and second direction books 230 and 240 contain the direction text for the activities as described above, the first direction book 230 activities being coordinated with the story text on the left page 222 and the second direction book 240 activities being coordinated with the story text on the right page 224. The key word 20 as described above appears in the main text page 222 or 224 and in the coordinated activity area as well as in the books 230 and 240 for coordination. The direction text areas include the types of activities which are coordinated with the story text as described in the preferred embodiment. The main text book 220 also has the tracing pad and descriptive introduction to parents as well as the codes and the translation guides which are described in the preferred embodiment.

FIGS. 5A and B show a third alternative embodiment in which a book assembly 300 has a stiff flat support backing 310 which is flexibly bendable in the middle at a vertical seam 312, enabling the two halves thus defined to be closable in the same way that a book closes. A main book 320 has left text pages 322 and right text pages 324 interleaved with left activity pages 326 and right activity pages 328 (as described in the alternative embodiment) and is removably attached to the backing 310 by VELCRO®, by an elastic band or other conventional retention means (not shown). Key word 329 is repeated as part of the activity page 326 or 328 opposite the text page in which the word contextually appears in the story, in addition to the key word which is repeated in the direction text books for purposes of coordination.

The left portion 340 of the backing 310 has a second support member 342 extending from and attached to a left edge 344 in a flexible manner, such as by a strip of flexible tape. The right portion 346 of the backing 310 has a third support member 348 extending from and attached to a right edge 349 in a flexible manner, such as by a strip of flexible tape.

A first direction book 350 is attached to the second support member 342 and a second direction book 352 is attached to the third support member 348. The direction books 350 and 352 open outward, i.e., away from the main book 320 and fold inward to provide a closable compact assembly. The direction book 350 contains direction text and repeats the key word that relates to the left page 322 of the main book 320 and the direction book 352 contains directions and repeats the key word relevant to the right page 324, both in an indexed manner described with respect to the alternative embodiment shown in FIG. 4.

In this manner the backing 310, the support members 342 and 348 and the direction books 350 and 352 form a shell to which different main books 320 can be removably attached. One main book 320 can be used with different direction text booklets and different activity pages so that as the child develops different skill level activities and directions can be utilized. This kit embodiment presents the advantage that a child can read the book 320 separate from the backing 310 and the direction books 350 and 352. In the case where a different main book 320 is to be attached to the backing 310, either the books 350 and 352 would be removably attached to the backing 310 and replaced with the appropriate direction booklets for the new main book 320, or, a new backing 310 with appropriate direction books 350 and 352 would already be attached to the backing 310. In the situation where direction books 350 and 352 would be removably attached, they could be attached with Velcro or other removable attachment means commonly known in the art. A tracing paper pad 360 can be removably attached to the inside back and/or front covers of the main book 320.

FIGS. 6A and B show a fourth alternative embodiment of a kit 400 according to the present invention in which a backing 410 is similar to the backing 310 and a main book 420 is similar to the main book 320. Direction books 450 and 452 are similar to the activity books 350 and 352, but are attached to the top edge portion 460 of the backing 410 by adhesive 462, staples, spiral wire bound or by other means. In this embodiment the activity books 450 and 452 are oriented so that the pages are turned upwards, rather than sideways as in the previous alternative third embodiment as shown in FIG. 5. Similar to the previous embodiment, the activity books 450 and 452 are coordinated so that the direction book 450 coordinates with the text on the left page 470 and the direction book 452 coordinates with the right hand page 472. Other aspects of the coordination, including code and translation guides, and key word repetition, is similar to the preferred embodiment. Alternatively, the direction books 450 and 452 can be attached to the cover below the main book 420. A tracing paper pad (not shown) can be removably attached to the inside cover of the main book 420.

FIGS. 7A and B show a fifth alternative embodiment of a kit 500 in which a backing 510 has a left portion 512 and a right portion 514 attached in a flexible manner, as described in the alternative fourth embodiment. A main book 520 is similar to the book 420 and is attached in a similar manner to the backing 510. A first direction book 530 comprises left pages 532 and right pages 534 and is bound by a seam 536 to the left portion 512 of the backing 510. Similarly, a second direction book 540 comprises left pages 542 and right pages 544 and is bound by a seam 546 to the right portion 514 of the backing 510. The direction books 530 and 540 coordinate with the text above them on the same side of the backing 510, as described above. The main book 520 can be removably attached as described above and removed by a child when the activity books are not desired. A tracing paper pad (not shown) can be removably attached to the inside cover of the main book 520.

FIGS. 8A through 8C show a sixth alternative embodiment of the present invention generally indicated at 600. A left hand main page 610 and right hand main page 611 each contain pictorial areas 614 and 615, respectively. FIGS. 8A and 8B show this embodiment open to the same page, with the pages lying flat in FIG. 8A, and the activity page being lifted slightly in FIG. 8B.

A left hand text portion 616 includes the first keyword indicated at 618. The activity pages are printed on leaves, such as leaf 620 that has right hand activity page 621 printed on one side and left hand activity page 622 (FIG. 8C) printed on the other side. The relationships among the elements are essentially as described hereinabove for the previous embodiments. Right hand activity page 621 includes activities relating to keyword 1 which is reproduced at 618' on activity page 621. The left hand text portion 616 (FIGS. 8A and 8B) include the keyword. Preferably, pictorial area 614 contains illustrations, and possibly other text, relating to the story segment in text page 616.

With leaf 620 flipped to the left hand side, the sixth alternate embodiment has the configuration shown in FIG. 8C. Activity page 622 contains activities relating to the second keyword, which is reproduced at 619' on the left hand activity page 622. Preferably, pictorial segment 615 relates to the story segment contained in right hand text page 617.

It may be seen from inspection of FIGS. 8A through 8C that the interleaved activity pages, such as those printed on leaf 620, may be coextensive in width with text pages 610 and 611 so that they have colinear side edges, indicated for example at 624 in FIG. 8A. The reverse indexing of activity page numbers and text page numbers, as described hereinabove, is maintained in the sixth embodiment.

Figure 9A:
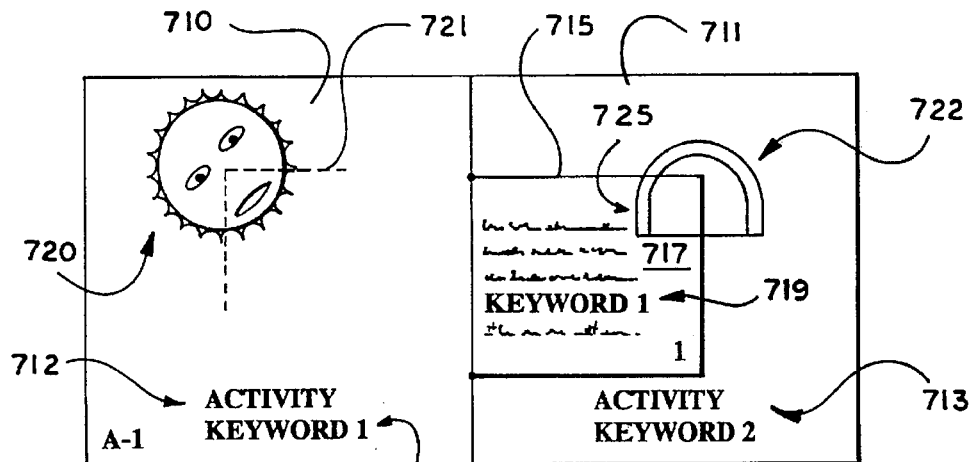
FIGS. 9A through 9C show plan views of an alternate seventh embodiment of the present invention.
Figure 9B:
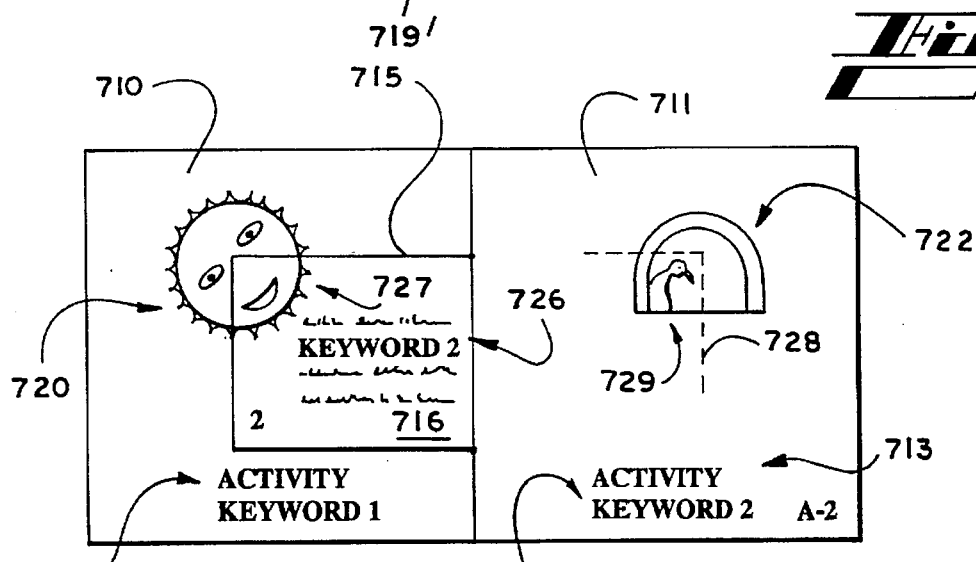
Figure 9C:
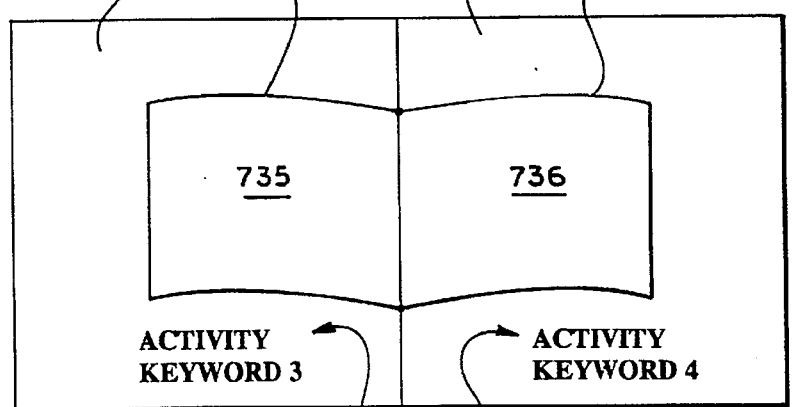

A seventh alternate embodiment is illustrated in FIGS. 9A through 9C. A first form of this embodiment is shown in FIGS. 9A and 9B, with an alternate construction for the leaves carrying the text pages shown in FIG. 9C. Turning first to FIGS. 9A and 9B, left and right pages 710 and 711 contain respective predetermined activity areas 712 and 713. These preferably appear at the bottom of the page so as to be under text appearing on leaf 715.

One side of leaf 715 contains right hand text area 717 with first keyword 719. This keyword is reproduced at 719' on left hand activity area 712. Thus, the activities described in activity area 712 relate to the first keyword that appears in the text of the story on right hand text page 717.

The seventh embodiment lends itself particularly to providing a dynamic story with the reverse indexed activity and text pages that appear in the other embodiments. For example, a fanciful illustration of the sun is shown at 720 and includes a portion defined by dashed line 721. It should be understood that dashed line 721 is shown to define a segment of the picture and is not part of the material printed in this embodiment of the invention. On page 711, a fanciful illustration of an arched window is shown at 722, a corner portion 725 of which appears on text page 717.

In this configuration, an exemplary use of the apparatus of the present invention would be to have the text on page 717 relate to the picture 720 of the sun including the countenance suggested by portion 721. The text may also relate to the empty arcuate window illustrated at 722, including a portion of this illustration 725 that is actually printed on text page 717.

When leaf 715 is flipped from its right hand position to its left hand position, as shown in FIG. 9B, the following are presented to the reader. Text page 716 is now visible, which includes second keyword 726. As with the other embodiments, this keyword is reproduced on the opposite page 711 at 726' in activity section 713. A new segment of the picture 720 of the sun appears in the upper left hand corner of text page 716, and is indicated as 727 in FIG. 9B. As is suggested by the fanciful illustrations, the attitude of the sun has changed as the story has progressed, indicated by the smile exhibited on segment 727. Similarly, the picture of the window at 722 on right hand page 711 has been changed by uncovering a portion defined by dashed line 728 shown in FIG. 9B. In the uncovered portion, a bird, indicated at 729, is now shown in the window.

In this way, the use of partial or complete substitute illustrations on text pages 716 and 717 that replace the portions of the illustrations 720 and 722, which portions are indicated by dashed lines 721 and 728, can develop the story in a way that many children find stimulating and exciting. The reverse indexed relationship of the activity pages to the text pages remains the same. While partial replacement of pictures by covering leaves is, per se, known in the art, the embodiment illustrated in FIGS. 9A and 9B shows an innovative use thereof that is integrated into the interactive book assembly of the present invention.

FIG. 9C illustrates a modification of the embodiment of FIG. 9B, which is preferably used in combination with the structure illustrated in FIGS. 9A and 9B. In FIGS. 9A and 9B, pages 710 and 711 are each adjacent to a single leaf 715 that contains text pages 716 and 717. It is preferable that, in other portions of the book, double leaves be used when the story and the desired illustrations lend themselves to such use. This is illustrated, for example, in FIG. 9C. Exemplary pages 710' and 711' contain activity areas 712' and 713' relating to keywords three and four in the example of a book illustrated in FIGS. 9A through 9C. Two leaves, 732 and 733 are bound between these. These are illustrated in an open position so that leaf 732 is showing an area 735 for a pictorial page and leaf 733 is showing a second area 736 that can form part of the same picture or a separate picture. In pages so constructed, the text relating to the third keyword, i.e., that is the subject of activity area 712', will appear on the back of leaf 732, i.e., the side that is not visible in the illustration of FIG. 9C. Thus, when leaf 732 is folded to the right hand side, this will be visible on the right hand side of the book.

Likewise, text relating to the fourth keyword in activity area 713' will appear on the back of leaf 733 and be visible when that leaf is folded to the left hand side. Text, or pictures can appear on the open pages 735 and 736, but pictures, particularly a unified picture joining illustrations on pages 710' and 711' can be advantageously used with this structure. It should be noted from the example shown in FIGS. 9A and 9B, that this structure also gives the possibilities for three variations in the same picture appearing on page 710. The first variation would be the picture actually printed on page 710. The second is the printed picture on page 710 as modified by a portion of page 735, and the third variation could be a second substituted portion that appears on the back side of leaf 733, which will be visible when leaf 733 is folded to the left hand side. Therefore, in this embodiment two leaves containing text pages are bound between each pair of larger pages 710' and 711' containing the activity areas. The adjacent faces of these two leaves include illustrations or text, but are not necessarily reverse indexed as are materials on the back sides of leaves 732 and 733.

Figure 10A:
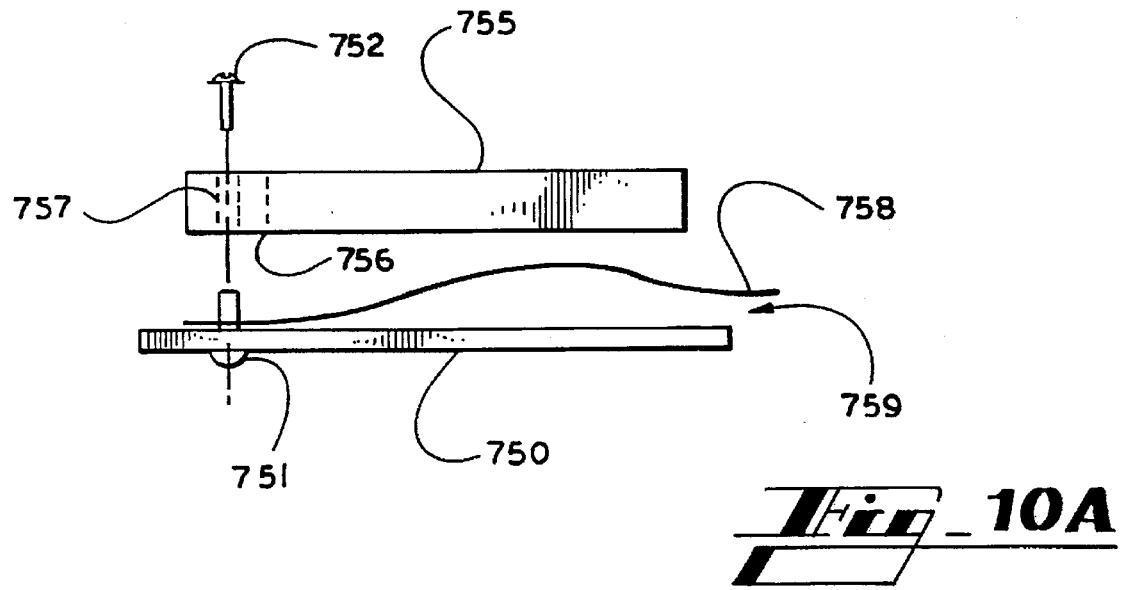
FIGS. 10A through 10C show an aspect of one form of the present invention particularly useful for assisting learning impaired children in tracing materials from embodiments of the present invention.
Figure 10B:
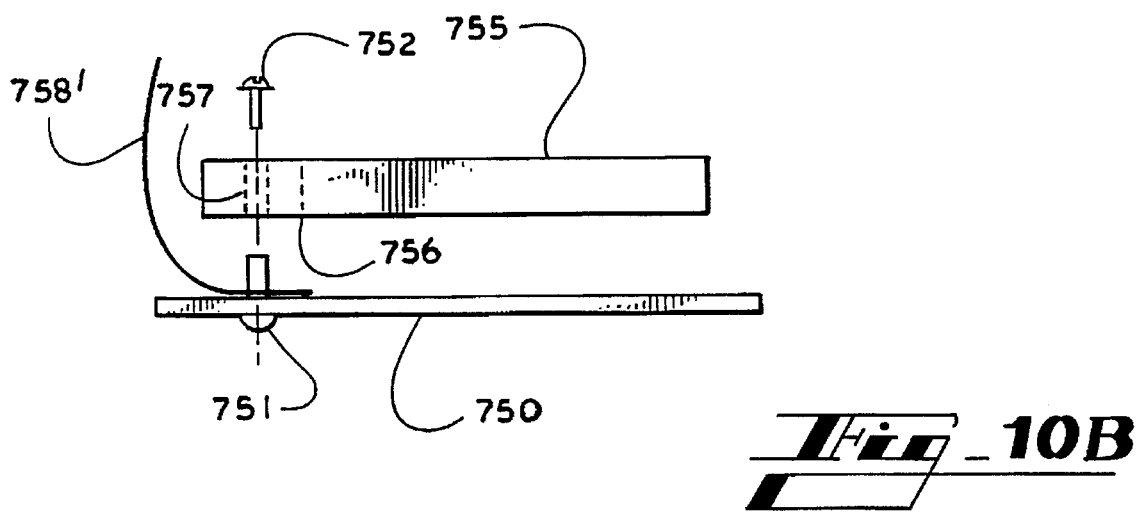
Figure 10C:
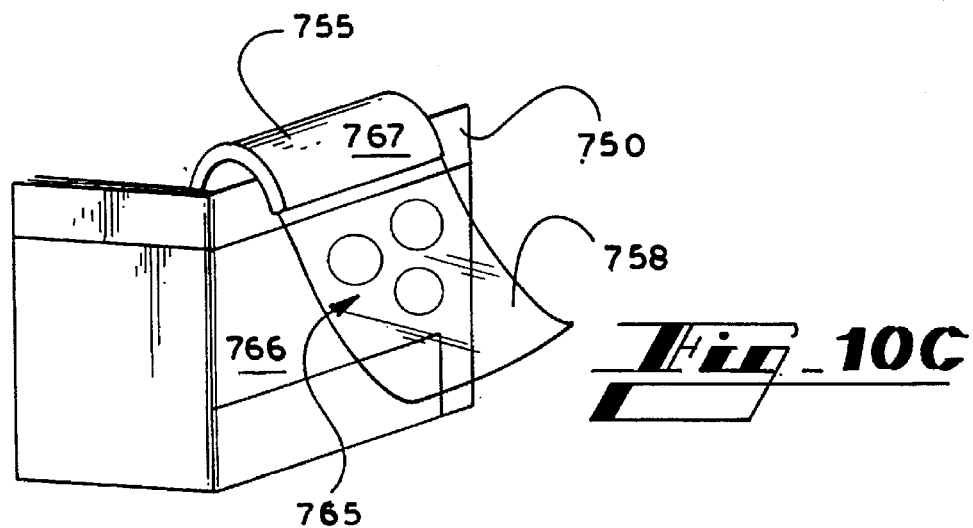

FIGS. 10A through 10C illustrate an aspect of the present invention that is particularly useful for working with children with particular types of learning impairments, particularly dyslexia. It is known to educators that children with perceptual problems such as dyslexia can be aided by viewing text or pictures through a transparent, pastel colored overlay. Pink or green are often used. FIG. 10A shows one arrangement in which a backing for the book 750 is fitted with a pair of conventional threaded posts, one of which is visible as 751 that mates with a threaded screw 752. A pad 755 of tracing paper such as velum is provided with perforations, indicated at 756, so that the sheets may be torn off one sheet at a time. These are also drilled, as illustrated in phantom at 757 so that screw 752 can be passed through to threaded post 751 to secure pad 755 in place. In FIG. 10A, a sheet of transparent pastel colored acetate, is indicated at 758. Sheet 758 is provided under pad 755 of tracing paper. FIG. 10B shows an alternate construction in which a similar acetate sheet 758' is attached so as to be folded over the top of pad 755 and lay on top of the upper most sheet thereof.

In using the embodiment of FIG. 10A, the material to be traced in inserted between acetate sheet 758 and backing 750, i.e., in the area indicated at 759. For example, pages of the book for which back 750 is the backing can be turned under sheet 758 until something the child wishes to trace appears. When this configuration is achieved, acetate sheet 755 is laid over the material to be traced and all pages save the bottom page of pad 750 of tracing papers are flipped upward so that the bottom sheet of tracing paper lays over acetate sheet 758. With this arrangement, the pastel color will still provide the benefits to the dyslexic child even against a typically white or off white background of tracing paper.

In the embodiment of FIG. 10B, it is preferable to fold both acetate sheet 758 and the top sheet of pad 755 back away from post 751, and lay the page upon which the drawings to be traced appears over the balance of pad 755. The selected sheet of tracing paper is then laid over the picture, and finally acetate sheet 758' is laid over the tracing paper. The child can view this, and trace with a nonmarking stylus or the like. The acetate sheet 758 can then be lifted for tracing directly onto the paper with a marking pencil or similar device. The acetate sheet 758' may be alternately overlaid and removed from the top of the tracing paper sheet in this arrangement to assist the child in forming a perception of what is illustrated on the page being traced.

To give a simple illustrative example, FIG. 10C has been included showing use of the structure shown in FIG. 10A. A picture including three circles, indicated at 765, appears on a page 766. Transparent acetate overlay sheet 758 is laid over the page including three circle 765. The user will then pull the next nearest sheet of pad 755, indicated at 767 down over acetate sheet 758 and commence to trace the three circles.

It will be appreciated that post 751 and screw 752 constitute a means for attaching at least one sheet of tracing paper and a flexible colored web 758 to a cover 750 of the book assembly described herein. It will appreciated by those skilled in the art that other equivalent apparatus may be used to attach the pad of tracing paper and the flexible colored web, such as acetate sheet 758, to the cover of a book. For example, flexible file clips, sometimes referred to as Arco™ type clips, may be used to attach the combination of tracing paper pad and colored web to the cover. Alternately, by way of additional example and not limitation, spring loaded parallel linkages, such as those used in folders for holding writing pads, may be used for the same purpose. The only limitation on equivalent structures for those shown in FIGS. 10A and 10B are that they accommodate a pad of tracing paper having perforations near the point at which the pad is held to the cover and can also secure the colored web in the appropriate location.

The use of the described structure with pastel colored acetate sheets is of assistance in helping dyslexic children.

It constitutes structure of preferred forms of the present invention that is particularly useful by such children, but does not form an essential part of the present invention.

In the second through seventh alternative embodiments the pages of the main text and activity pages are interleaved and reverse coordinated as described in the preferred embodiment. Similarly, each of the alternative embodiments have the introductory instruction material, key word coordination, codes and translation guides and graphical materials in the areas as described hereinabove. In these alternative embodiments, it is also possible for the story text and activity areas to be switched, as described in the preferred embodiment.

While the present invention has been described with respect to child/parent education materials, the present invention can also be adapted for use by students in school or as a self-study guide or between a teacher and one or more students.

The coordination of materials in all the embodiments can be summarized as follows. Each page of story text contains a contextually based key word. This key word is repeated in the activity page proximate to the activity direction text on the page opposite the story text page and is placed to be visible even when the main text pages are turned covering the visually integrated part of the activity page under the text, since it its on a different part of the page. The direction text contains activity instructions relating back to the key word on the text page. Each activity is coded with a skill type identifier and an age level identifier. Both identifiers are translated on a separate page in the back (front, or elsewhere) of the book. An introduction to the user parent provides instructions for the use of the book assembly. Except for FIG. 1C, where pages are of a similar size, in each of these embodiments relevant materials are indexed to a main text which is interleaved with an activity text to form two separate books where pages that are smaller on at least one, and preferably two edges consistently alternate with larger pages to form a coordinated and combined text and activity workbook for presentation of the indexed relevant materials.

It is an advantage and a distinction over the prior art that the present invention is integrated into a textually coordinated and indexed set of materials that can be utilized by a parent and a child together to develop skills. Prior instructional books do not have the coordinated direction text areas coordinated with a given key word which is easily accessible as with the present invention. The present invention seeks to increase the interaction between parent and child and to provide simple to follow instructions for the parent to educate their child. This is conveniently accomplished by having the key word in the story repeated proximate to the direction text area on the coordinating page so that the parent can see which directions and activities relate to the story. The parent just reads, without having to interpret the activities. Directions can be in italics or other distinguishable print. Moreover, the coding of the various types of activities and the coding of the age level of the activity can indicate to the parent the appropriate activity with which to challenge the child. The child can, with the kit assemblies of the alternative embodiments, remove the book for reading alone, or use with a parent with the directions and activities when the parent or child desires to do the activities together. The tracing pad in all the embodiments allows the child to more freely express and develop his or her skills and talents without marking up the book.

The numbering of the text pages is coordinated to the numbering of the activity pages so that the parent can easily associate the correct material in addition to the key word identification. The use of a visually distinguishable key word, such as by highlighting or bold-faced print, makes identification of the key word easy. The key word is chosen to be contextually important in the text.

Unlike other activity workbooks currently in use, parents or teachers do not need to rephrase or restructure the directions presented in this integrated text and workbook in order to present the material to the person being instructed. Instead, the parent or reader simply finishes reading the sentence containing the key word in the text and then reads the material just as it is presented in the direction text. Since the key word in the text is re-introduced in the activity section proximate to the direction text, and is part of the direction text, a continuous integrated presentation results, beginning with the key word and continuing through the coordinated activity directions. After the child has completed each activity as directed, the process can be repeated for as many activities as desired.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

I claim:

1. A book cover into which books may be placed, comprising:
   - an outer cover member comprising a front panel foldably connected to a back panel;
   - each of said panels holding at least one sheet of tracing paper attached to said panel;
   - such that said outer cover member is capable of removably receiving any one of a plurality of books having existing covers interchangeably, the received book being positioned with any page of the book underlying a sheet of said tracing paper.

2. The book cover of claim 1, further comprising a means for attaching a transparent flexible colored web to said panels so that said web and at least one sheet of said tracing paper may overlay any of said pages of said book in a sandwiched configuration.

3. A method of tracing information from pages of a plurality of books, comprising the steps of:
   - inserting a first book into a cover structure, said cover structure comprising:
     - a cover member comprising a front panel foldably connected to a back panel; ,
     - each of said panels holding at least one sheet of tracing paper attached to said panel;
   - overlaying a sheet of said tracing paper attached to said front panel over one of said pages opened to a left side of said first book;
   - overlaying a sheet of said tracing paper attached to said back panel over one of said pages opened to a right side of said first book;

removing said first book from said cover structure;

inserting a second book into said cover structure;

overlaying a sheet of said tracing paper attached to said front panel over one of said pages opened to a left side of said second book; and overlaying a sheet of said tracing paper attached to said back panel over one of said pages opened to a right side of said second book.

4. The method of claim 3, further comprising the step of attaching a transparent flexible colored web to said panels so that said web and at least one sheet of said tracing paper may overlay any of said pages of said books in a sandwiched configuration.

5. A removable book cover, comprising:

an outer cover member comprising a front panel foldably connected to a back panel;

each of said panels holding at least one sheet of a material through which printed information can be viewed, attached to said panel;

such that said outer cover member is capable of removably receiving any one of a plurality of books interchangeably, the received book being positioned with any page of the book underlying a sheet of said material.

* * * * *